United States Patent [19]
Tayloe et al.

[11] Patent Number: 5,373,506
[45] Date of Patent: Dec. 13, 1994

[54] METHOD AND APPARATUS FOR PAGING IN A COMMUNICATION SYSTEM

[75] Inventors: Daniel R. Tayloe; Eugene J. Bruckert, both of Arlington Heights, Ill.

[73] Assignee: Motorola Inc., Schaumburg, Ill.

[21] Appl. No.: 88,598

[22] Filed: Jul. 9, 1993

Related U.S. Application Data

[63] Continuation of Ser. No. 617,749, Nov. 26, 1990, abandoned.

[51] Int. Cl.⁵ .............................................. H04J 3/16
[52] U.S. Cl. ................................. 370/95.1; 340/825.44
[58] Field of Search ................. 370/95.1, 84, 99, 95.3, 370/94.1, 80, 50, 62; 379/59–62, 57, 56, 202; 340/825.44, 825.49; 455/33.1–33.4, 34.1, 34.2, 35.1, 54.1, 54.2, 56.1

[56] References Cited

U.S. PATENT DOCUMENTS

| | | | |
|---|---|---|---|
| 4,745,408 | 5/1988 | Nagata et al. | 340/825.44 |
| 4,794,635 | 12/1988 | Hess | 379/60 |
| 4,802,201 | 1/1989 | Yoshizawa et al. | 379/62 |
| 4,866,710 | 9/1989 | Schaeffer | 370/95.1 |
| 4,868,562 | 9/1989 | Andros et al. | 455/33 |
| 4,914,649 | 4/1990 | Schwendeman et al. | 455/32 |
| 5,014,314 | 5/1991 | Mufford et al. | 455/33 |
| 5,029,163 | 7/1991 | Chao et al. | 370/80 |
| 5,072,444 | 12/1991 | Breeden et al. | 370/84 |
| 5,150,361 | 9/1992 | Wieczorek et al. | 370/95.1 |
| 5,239,545 | 8/1993 | Buchholz | 370/95.1 |

FOREIGN PATENT DOCUMENTS 2110850  6/1983  United Kingdom.
8805248  1/1987  WIPO.

*Primary Examiner*—Douglas W. Olms
*Assistant Examiner*—Dang Ton
*Attorney, Agent, or Firm*—Richard A. Sonnentag

[57] ABSTRACT

A fixed base-site (115) periodically pages subscribers (120) in a paging area (100). To prolong the battery life of the subscribers (120), paging groups (520) are not sent to subscribers (120) as often when the paging load is small. Since the subscribers (120) support discontinuous receive, processing of the pages will not take place as frequently and thus a battery savings is realized. When the fixed base-site (115) receives more pages than can be supported without exceeding a predetermined delay, the fixed base-site (115) dynamically increases the frequency that paging groups (520) are transmitted to subscribers (120). When the paging load decreases, the fixed base-site (115) dynamically decreases the frequency that paging groups (520) are transmitted to subscribers (120) and again a savings in battery life is realized.

32 Claims, 5 Drawing Sheets

300

400

METHOD AND APPARATUS FOR PAGING IN A COMMUNICATION SYSTEM

This is a continuation of application Ser. No. 07/617,749, filed Nov. 26, 1990 and now abandoned.

FIELD OF THE INVENTION

This invention relates generally to radiotelephone systems and more specifically to radiotelephone systems which page subscribers to establish a communication link.

BACKGROUND OF THE INVENTION

In many cellular applications, the battery life of subscriber units such as portables or transportables is a prime concern. Some cellular systems, such as the GSM (Groupe Special Mobile) Digital Cellular System, support "discontinuous receive" (DRX) a feature whereby pages, or calls to subscriber units, are uniformly broken into different groups and broadcast over the air at specific intervals. This mechanism allows mobiles which are not presently in use to "sleep" when pages to it are not being broadcast. The larger the number of groups the pages are broken into, the longer the period that a mobile can sleep before needing to awaken in order to check for pages that may be destined for it. This mechanism is limited, however, in that the largest number of paging groups (which correspond to the greatest battery savings) introduce the largest amount of delay into the system paging response time. Likewise, the configuration that introduces minimum system response delay also corresponds to the greatest level of standby battery consumption.

Thus, the need exists for a radiotelephone system which compromises between the opposing constraints of battery drain and system response delay.

SUMMARY OF THE INVENTION

A fixed base-site in a communication system periodically and individually pages a plurality of subscribers to establish a communication link. The fixed base-site provides a plurality of repetitive timeslots, including at least first and second timeslots, generates at least one paging signal and paging signal statistics associated therewith and assigns said one paging signal to one of said first and second timeslots. The fixed base-site, responsive to the assignment, transmits the one paging signal to at least one subscriber and alters the assignment based on the transmission and the generation.

DETAILED DESCRIPTION OF A PREFERRED EMBODIMENT

Figure 1:
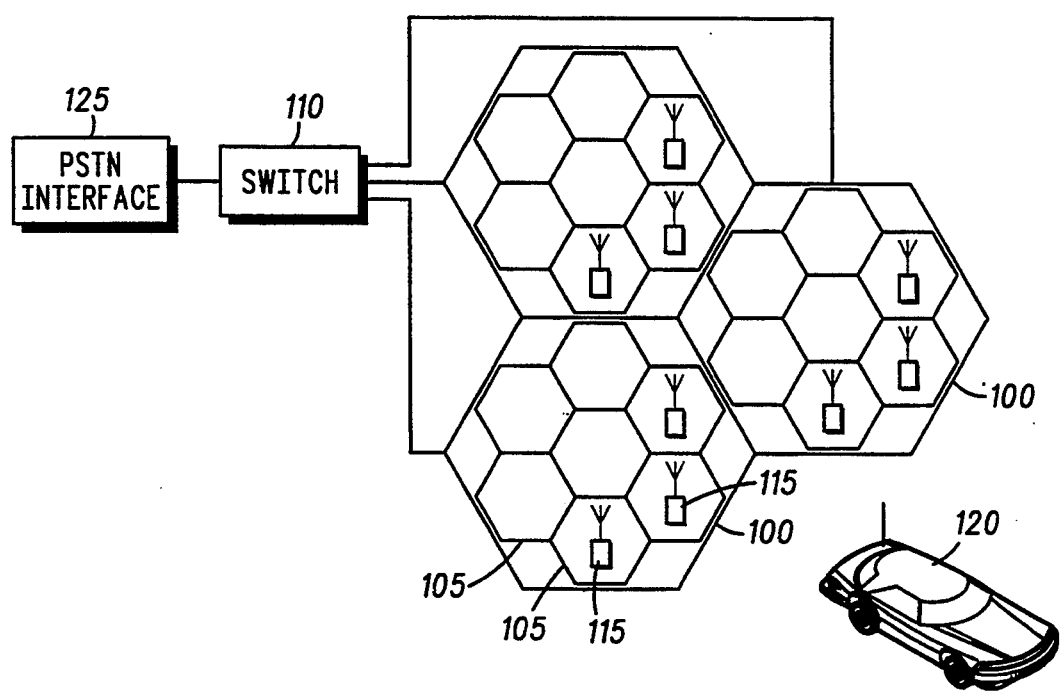
FIG. 1 generally depicts a TDMA radiotelephone system that could employ the present invention.

FIG. 1 generally depicts a TDMA radiotelephone system in accordance with the invention. In the preferred embodiment, the system is the Groupe Special Mobile (GSM) Pan European Digital Cellular System, but the invention may apply to any systems that support discontinuous transmission/reception. The GSM system is comprised of a plurality of cells 105 which when combined form paging areas 100. Each cell 105 in a paging area 100 has located within its boundary a base-site 115 which is used to communicate to a mobile 120. Each base-site 115 is coupled to another base-site through a switch 110, which in the preferred embodiment is a Motorola EMX 2500E. The switch in turn is typically connected to a public switched telephone network (PSTN) 125. Generally, the operation of the system is as follows. The mobile 120 enters the paging area 100, which again is subdivided into cells 105. The mobile 120 registers with the switch 110 through the particular base-site 115 whose cell 105 it is in. The mobile 120 is now registered to the particular paging area 100 the base-site 115 is located in. For a land-to-mobile call, every cell 105 in the paging area 100 transmits a page to the mobile 120. If the mobile 120 is still in the paging area 100, it will transmit a response back to the base-site 115 whose cell 105 it is in. The corresponding base-site 115 will communicate back to the switch 110 that the mobile 120 responded and the land-to-mobile call is then established.

Figure 2:
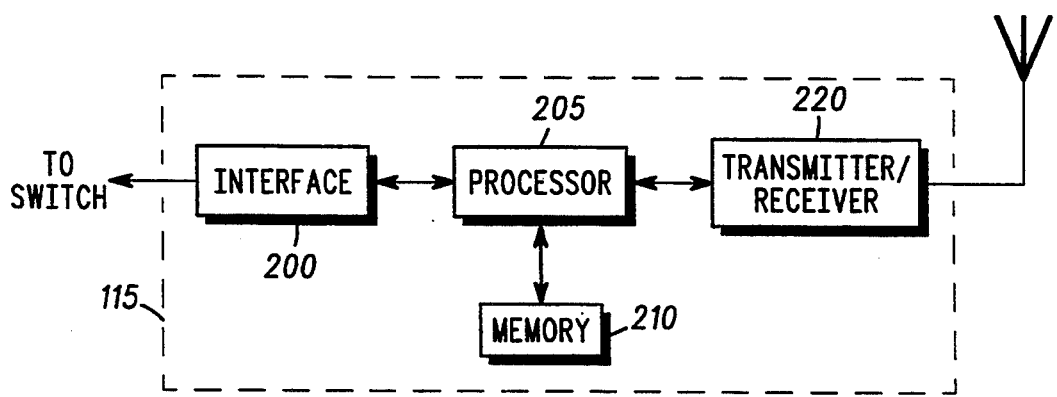
FIG. 2 generally illustrates a block diagram of the fixed base-site.

FIG. 2 generally depicts the internal architecture of the base-site 105. A typical interface 200 is coupled to a processor 205, which is a Motorola MC68030 in the preferred embodiment. Typical memory 210 is coupled to the processor 205 and is used to store look-up tables, algorithms, etc. The processor 205 is in turn coupled to a transmitter/receiver 220 which provides an interface to the RF environment. Generally, a page request will be received by the interface 200 and sent to the processor 205 for processing. After processing, the request is sent to the transmitter/receiver 220 where it is transmitted over the air to the mobile 120.

Figure 3:
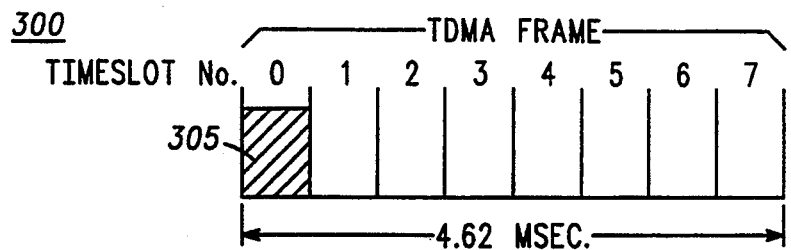
FIG. 3 generally depicts a GSM TDMA frame.
Figure 4:
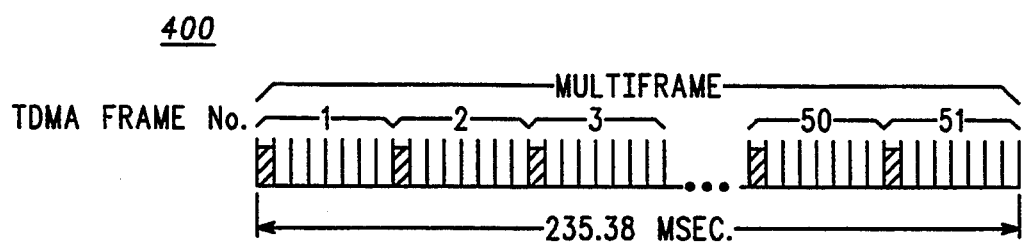
FIG. 4 generally illustrates GSM TDMA frames comprising a multiframe.

FIG. 3 generally depicts a GSM TDMA frame 300 as defined in GSM Recommendation 5.02, version 3.4.1, Jan. 1990. Repetitive TDMA frames 300 are sent contain traffic and control data and are sent out of the base-site 115 on carriers of different frequencies to the mobile 120. In the preferred embodiment, each TDMA frame 300 is 4.62 milliseconds and is comprised of eight timeslots 305. Each timeslot 305 is approximately 577 microseconds and may contain traffic or control data. Timeslot zero of every TDMA frame 300 of at least one carrier is typically reserved for control data. FIG. 4 depicts a multiframe 400 as defined in GSM Recommendation 5.02, version 3.4.1, Jan. 1990. A approximately 235.38 milliseconds, is comprised of 51 TDMA frames 300 and contains control data. In the preferred embodiment, it is the multiframe 400 which contains the paging information in accordance with the invention.

Figure 5:
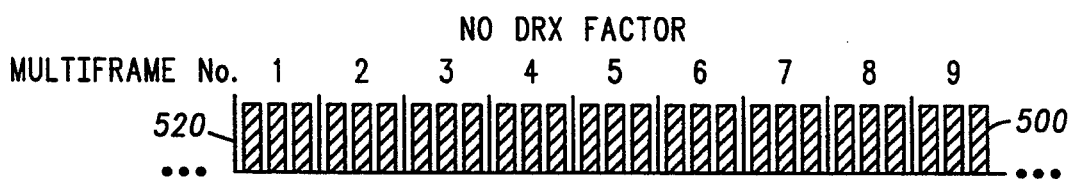
FIG. 5 generally depicts paging groups versus DRX factors in accordance with the invention.
Figure 5:
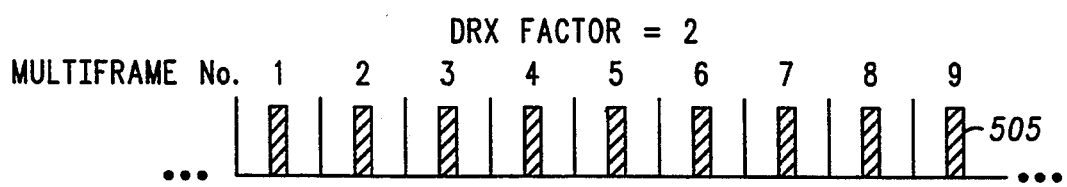
Figure 5:
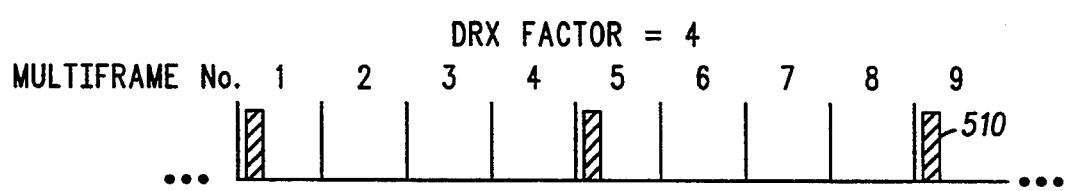

FIG. 5 depicts a series of multiframes 500, which in the preferred embodiment contain three paging groups 520 in accordance with the invention. Each paging group 520 contains pages for up to four separate subscribers 120, thus up to twelve separate subscribers 120 can be paged every multiframe 400. Multiframe series 500 depicts three paging groups sent out every multiframe. The mobile 120 supports discontinuous receive, which is defined by GSM recommendation 4.08, version 3.9.0, Jul. 1990 and GSM Recommendation 5.02, version 3.4.1, Jan. 1990. During discontinuous receive, the mobile 120 "sleeps" when a paging group is not received. When the mobile 120 enters a particular paging area 100, part of the registration process the entire system undergoes is for the base-site 115 to notify the mobile 120 how often to "wake up" and process a page. A term called the 'DRX factor', which is a paging signal repetition factor, is introduced to help describe the repetition of paging groups 520. For example, multiframe series 500 represents no DRX factor thus when the base-site 115 pages the mobile 120, the mobile 120 will wake up every multiframe 400 and process the pages found in all of the three paging groups 520. This means the mobile is processing, and thus using battery energy, every multiframe 400. Multiframe series 505 represents a DRX factor of 2, or in other words, the mobile 120 wakes up every other multiframe to process the page found in one of the three paging groups 520. Likewise, multiframe series 510 represents a DRX factor of 4 thus the mobile 120 wakes up every fourth multiframe to process the page found in one of the three paging groups 520. It is clear the mobile will sleep longer for higher DRX factors and less for lower DRX factors. This means that the larger the DRX factor, the less processing required by the mobile to interpret the paging groups 320 and thus, the larger the battery savings. In the preferred embodiment, the system can have a DRX factor of up to 9.

The system, while supporting discontinuous receive at the mobile 120 and incorporating the DRX factors described in FIG. 5, does not compromise load induced queuing delays. For example, the multiframe series 500 represents no DRX factor, thus mobiles will process pages every multiframe 400. In the preferred embodiment, three multiframes, up to 36 pages in all, are required to support approximately 80,000 to 100,000 subscribers in a given paging area 100. At high usage time, the number of pages that the system will be required to make will be high. For smaller DRX factors, say 2 or 3, the paging groups 520 are sent out enough to support the high paging load thus keeping the load induce queueing delay within desired boundaries. Larger DRX factors, however, are not sent out as often consequently causing excessive delays during busy hour loading conditions.

Figure 6:
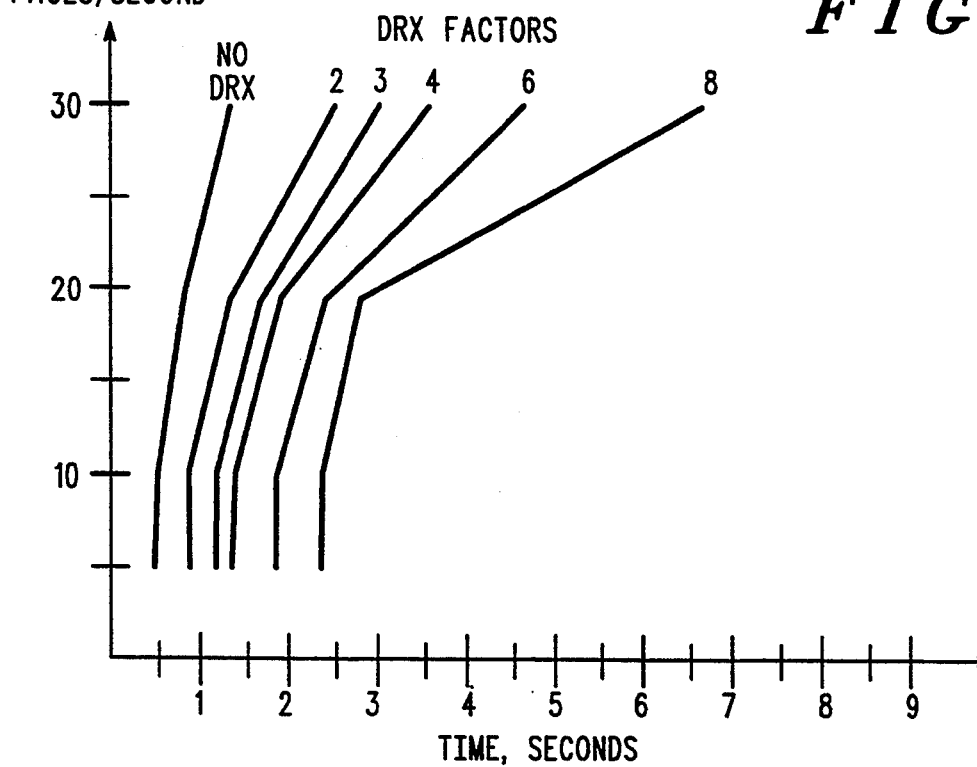
FIG. 6 illustrates load versus load induced queueing delay for a family of varying DRX factors in accordance with the invention.

FIG. 6 shows delay versus paging load for a family of differing DRX factors. As can be seen, when the DRX factor is low, paging groups 520 are sent out more often thus keeping the pages in the paging request queue at a minimum and consequently minimizing transmission delay. As the DRX factor increases, mobiles 120 do not process as often causing the paging request queue to build which in turn results in increasing transmission delay. The curves shown for the different DRX factors handle up to approximately 20 pages per second within a reasonable delay time but as the paging load increases, higher DRX factors introduce increased paging request queue time and thus transmission delay.

Figure 7:
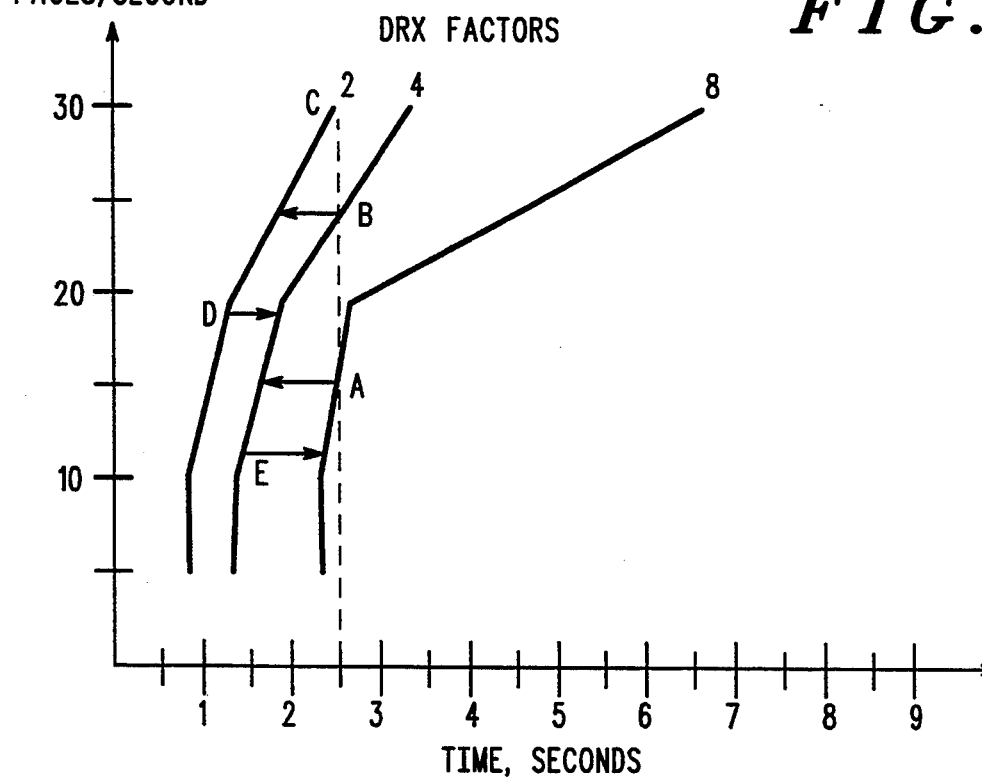
FIG. 7 depicts a typical hysteresis between varying DRX factors in accordance with the invention.

The DRX factor can be changed based on the time of day, paging load and paging load queueing delay, which are each considered paging signal statistics. FIG. 7 depicts how the compromise between paging load, paging load queueing delay and battery savings in the mobile 120 is performed. The base-site 115 assumes that a given delay is acceptable; for this example, the acceptable delay will be 2.5 second. As seen, a DRX factor of eight would maximize battery conservation and yet stay within delay limitations up to approximately 16 pages per second (point "A" in the example). Above this, the DRX factor would be reduced by the system to a DRX factor of 4 (for example) in order to keep the system delays within limits. If the paging load were to climb further to approximately 24 pages per second (point "B" in the example), the DRX factor could be reduced by the system even further to perhaps 2. If the paging load were to increase even further (point "C"perhaps), a system configuration change which would perhaps increase the number of paging groups 520 per multiframe 400 would have to occur. As the paging load decreases (point "D"), the system can increase the DRX factor back to 4 where the total number of pages required is tolerable for that DRX factor. If the number of pages per second were to decrease even further (point "E"), the system can increase the DRX factor from 4 to 8 and still stay within the specified delay limit. This "hysteresis" is then repeated as the paging load begins to increase.

The paging delay can be determined several ways, the most direct of which is to time stamp the pages as they arrive at the base-site 115. As the pages are sent out, the time stamp can be compared to the present time to determine the delay. Another method is to measure the depth of the paging queue for each separate paging group to be sent out. The depth of the queue can be used as an estimate of the delay pages will experience. In either case, whether queue depth or delay time is used as a criterion for excessive delay, the percentage of pages above an upper threshold (delayed more than a predetermined time difference value $T_U$ or queueing deeper than a predetermined queue length value $Q_U$) compared with the total pages accumulated over a time interval $T_1$ falls above an acceptable percentage, a decrease in the DRX factor is required in order to keep delays within desired limits. Likewise, a lower threshold can be established such that when the percentage of pages below a lower threshold ($T_L$ and $Q_L$) compared to the total pages accumulated over a time interval $T_2$ falls below an acceptable percentage, the DRX factor can be increased in order to conserve battery drain. The time interval $T_1$ should be shorter than $T_2$ so that it takes a relatively short time to decrease the DRX factor due to a rising paging load and a relatively long time to increase the DRX factor in the face of a decreasing paging load.

Figure 8A:
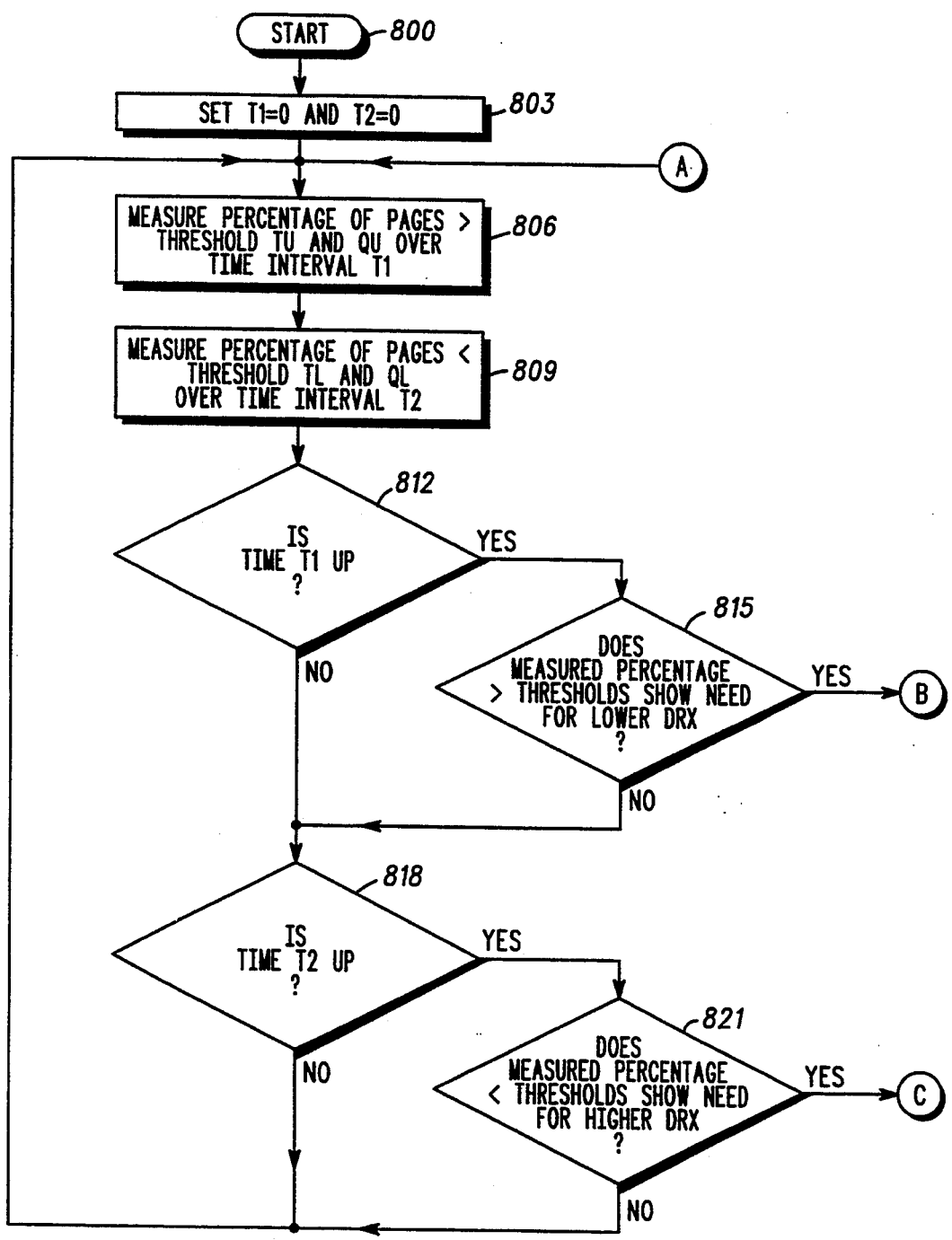
FIGS. 8(A–B) illustrate a flow diagram of the steps the fixed base-site undergoes to perform hysteresis in accordance with the invention.
Figure 8B:
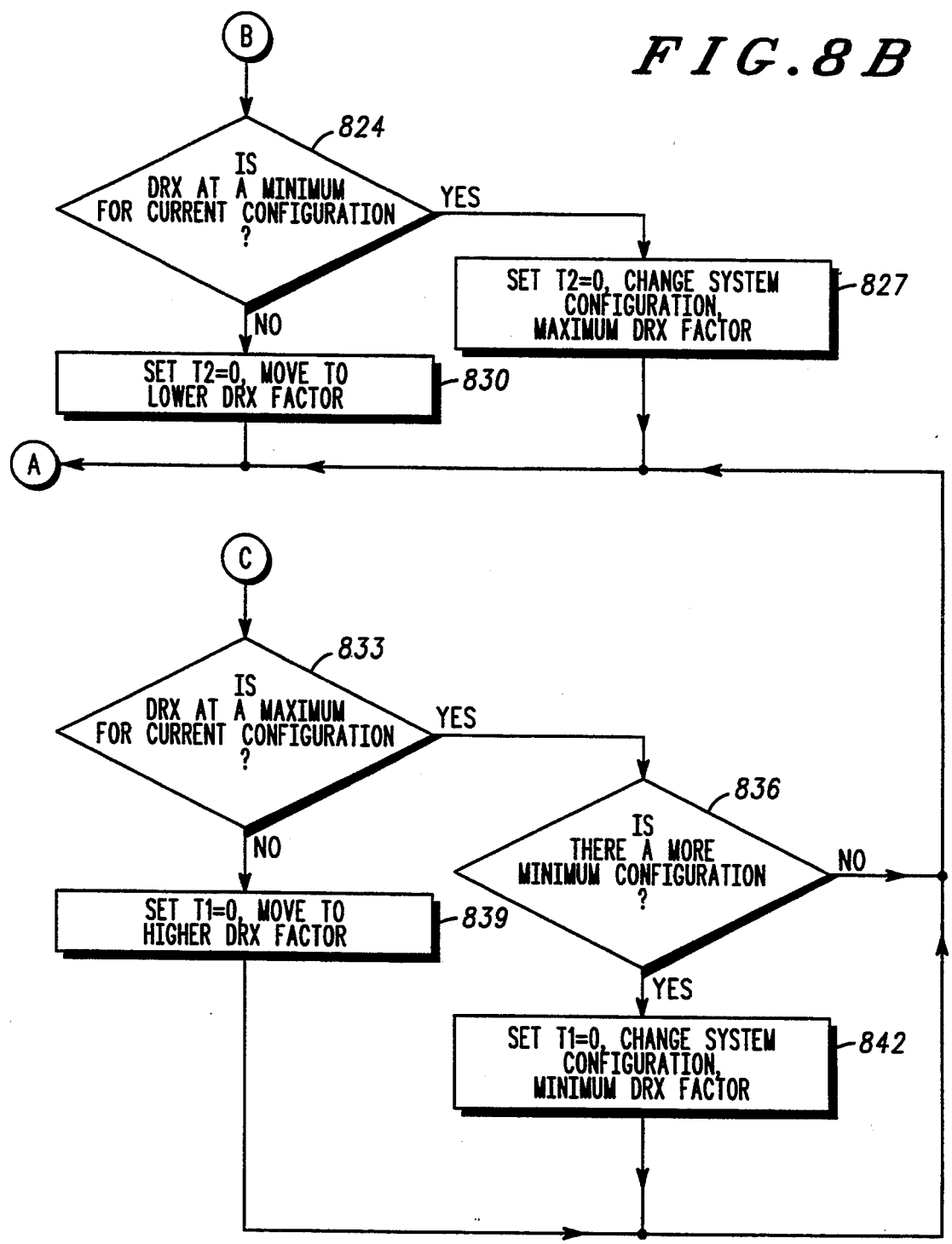

FIGS. 8(A-B) are a flow diagram generally depicting the steps the system undergoes to perform the hysteresis in accordance with the invention. The process starts at 800 by setting at 803 time interval $T_1$ and $T_2$ equal to 0. The base-site 115 then measures at 806 the percentage of pages that have delay or queue length greater than thresholds $T_U$ and $Q_U$ over the time interval $T_1$. The base-site 115 also measures at 809 the percentage of pages that have delay or queue length less than thresholds $T_L$ and $Q_L$ over the time interval $T_2$. A test is then performed at 812 the time interval $T_1$ has expired, a test is performed at 815 to determined if the measured percentage greater than the upper thresholds ($T_U$ and $Q_U$) shows a need for a lower DRX factor. If it does, a test is performed at 824 to determine if the DRX factor is at a minimum for the current configuration. If it is, $T_2$ is set to zero, the base-site 115 is reconfigured to transmit more page groups per multiframe, the DRX factor is set to a maximum at 827 and the process repeats starting at block 806. If the DRX factor is not at a minimum, $T_2$ is set to zero, the base-site 115 moves to a lower DRX factor at 830 and again the process repeats starting at block 806.

Returning to blocks 812 and 815, if time interval $T_1$ has expired or the measured percentage does not show a need for a lower DRX factor, the base-site 115 performs a test at 818 to determine if time interval $T_2$ has expired. If it has, a test is performed at 821 to determine if the measured percentage below the lower thresholds ($T_L$ and $Q_L$) show a need for a higher DRX factor. If it does not or if time interval $T_2$ has not expired, the process repeats starting at block 806. If the measured percentage below the lower thresholds shows a need for a higher DRX factor, the base-site 115 performs a test at 833 to determine if the DRX factor is at a minimum for the current configuration. If it is not, $T_1$ is set to zero, the base-site 115 moves to a higher DRX factor at 839 and again the process repeats starting at block 806. If the DRX factor is at a maximum for the current configuration, a test is performed at 836 to determine if a more minimum configuration (a configuration whereby less page groups per multiframe are transmitted) exists. If it does not, the process repeats starting at block 806. If a more minimum configuration does exist, $T_1$ is set to zero, the base-site 115 changes configuration, the DRX factor for the new configuration is set at a minimum at 842 and the process repeats starting at block 806.

While performing the hysteresis, the base-site 115 constantly keeps track of such factors as transmission delay, queue depth and paging load and dynamically changes the DRX factor or the rate at which mobiles 120 process pages. In this way, the base-site 115 maintains efficient paging of mobiles 120 while prolonging the battery life of those mobiles.

What I claim is:

1. A fixed base-site in a radiotelephone system, the fixed base-site coupled to an external interface wherein the external interface periodically sends a paging request to request the fixed base-site to page individually a plurality of subscribers, the fixed base-site comprising:
   means for providing a plurality of repetitive timeslots, including at least first and second timeslots;
   means for providing a predetermined time difference value and a predetermined threshold value;
   means for receiving a paging request from the external interface;
   means for generating a paging signal in response to said receiving a paging request;
   means for assigning said generated paging signal to said first timeslot;
   means, responsive to said means for assigning, for transmitting said paging signal to at least one subscriber;
   means for determining a time difference between a time when said means for receiving receives said one paging request and a time when said means for transmitting transmits said one paging signal;
   means, responsive to said means for determining, for measuring, relative to the number of pages said means for receiving receives, the number of pages having said determined time difference greater than said predetermined time difference value; and
   means, responsive to said means for measuring, for assigning said generated paging signal additionally to said second timeslot when said measured number of pages is greater than said predetermined threshold value.

2. The fixed base-site of claim 1 wherein said means for assigning further comprises means for assigning said paging signal to at least each of said repetitive timeslots.

3. The fixed base-site of claim 1 wherein said means for providing a predetermined time difference value further comprises means for providing a predetermined queue length value.

4. The fixed base-site of claim 3 wherein said means for receiving further comprises means for generating a queue for said at least one paging request.

5. The fixed base-site of claim 4 wherein said means for generating a queue further comprises means for determining the length of said queue.

6. The fixed base-site of claim 5 wherein said means for determining further comprises means for measuring, relative to the number of pages said means for receiving receives, for measuring the number of pages having said determined queue length greater than said predetermined queue length value.

7. The fixed base-site of claim 6 wherein said means for assigning said generated paging signal additionally to said second timeslot further comprises means for assigning said generated paging signal additionally to said second timeslot when said measured number of pages having said determined queue length greater than said predetermined queue length value is greater than said predetermined threshold value.

8. The fixed base-site of claim 7 wherein said means for assigning further comprises means for assigning said paging signal to at least each of said repetitive timeslots.

9. A radiotelephone system incorporating a fixed base-site coupled to an external interface wherein the external interface periodically sends a paging request to the fixed base-site to request the fixed base-site to establish a communication link to a subscriber out of a plurality of subscribers, the radiotelephone system comprising:
   means, at the fixed base-site, for providing a plurality of repetitive timeslots, including at least first and second timeslots;
   means, at the fixed base-site, for providing a predetermined time difference value and a predetermined threshold value;
   means, at the external interface, for sending the paging request;
   means, at the fixed base-site, for receiving the paging request from the external interface;
   means, at the fixed base-site, for generating a paging signal in response to said receiving a paging request;
   means, at the fixed base-site, for assigning said generated paging signal to said first timeslot;
   means, at the fixed base-site and responsive to said means for assigning, for transmitting said paging signal to the one subscriber;
   means, at the subscriber, for acknowledging said transmission of said paging signal;
   means, at the fixed base-site, for determining a time difference between a time when said means for receiving receives the paging request and a time when said means for transmitting transmits said one paging signal; and
   means, responsive to said means for determining, for measuring, relative to the number of pages said means for receiving receives, the number of pages having said determined time difference greater than said predetermined time difference value; and means, at the fixed base-site and responsive to said means for measuring, for assigning said generated paging signal additionally to said second timeslot when said measured number of pages is greater than said predetermined threshold value.

10. The fixed base-site of claim 9 wherein said means for assigning further comprises means for assigning said paging signal to each of said repetitive timeslots.

11. The fixed base-site of claim 9 wherein said means for providing a predetermined time difference value further comprises means for providing a predetermined queue length value.

12. The fixed base-site of claim 11 wherein said means for receiving further comprises means for generating a queue for said at least one paging request.

13. The fixed base-site of claim 12 wherein said means for generating a queue further comprises means for determining the length of said queue.

14. The fixed base-site of claim 13 wherein said means for determining further comprises means for measuring, relative to the number of pages said means for receiving receives, for measuring the number of pages having said determined queue length greater than said predetermined queue length value.

15. The fixed base-site of claim 14 wherein said means for assigning said generated paging signal additionally to said second timeslot further comprises means for assigning said generated paging signal additionally to said second timeslot when said measured number of pages having said determined queue length greater than said predetermined queue length value is greater than said predetermined threshold value.

16. The fixed base-site of claim 15 wherein said means for assigning further comprises means for assigning said paging signal to each of said repetitive timeslots.

17. A method of paging incorporating a fixed base-site coupled to an external interface in a radiotelephone system, wherein the external interface periodically sends a paging request to request the fixed base-site to page individually a plurality of subscribers, the method comprising the steps of:

providing a plurality of repetitive timeslots, including at least first and second timeslots;

providing a predetermined time difference value and a predetermined threshold value;

receiving a paging request from the external interface;

generating a paging signal in response to said receiving a paging request;

assigning said generated paging signal to said first timeslot;

transmitting, responsive to said means for assigning, said paging signal to at least one subscriber;

determining a time difference between a time when said means for receiving receives said one paging request and a time when said step of transmitting transmits said one paging signal; and measuring, responsive to said step of determining and relative to the number of pages said step of receiving receives, the number of pages having said determined time difference greater than said predetermined time difference value; and assigning, responsive to said means for measuring, said generated paging signal additionally to said second timeslot when said measured number of pages is greater than said predetermined threshold value.

18. The method of claim 17 wherein said step of assigning further comprises the step of assigning said paging signal to at least each of said repetitive timeslots.

19. The method of claim 17 wherein said step of providing a predetermined time difference value further comprises the step of providing a predetermined queue length value.

20. The method of claim 19 wherein said step of receiving further comprises the step of generating a queue for said at least one paging request.

21. The method of claim 20 wherein said step of generating a queue further comprises the step of determining the length of said queue.

22. The method of claim 21 wherein said step of determining further comprises the step of measuring, relative to the number of pages said step of receiving receives, for measuring the number of pages having said determined queue length greater than said predetermined queue length value.

23. The method of claim 22 wherein said step of assigning said generated paging signal additionally to said second timeslot further comprises the step of assigning said generated paging signal additionally to said second timeslot when said measured number of pages having said determined queue length greater than said predetermined queue length value is greater than said predetermined threshold value.

24. The method of claim 23 wherein said step of assigning further comprises the step of assigning said paging signal to at least each of said repetitive timeslots.

25. A method of paging in a radiotelephone system incorporating a fixed base-site coupled to an external interface wherein the external interface periodically sends a paging request to the fixed base-site to request the fixed base-site to establish a communication link to one of a plurality of subscribers, the method comprising the steps of:

providing, at the fixed base-site, a plurality of repetitive timeslots, including at least first and second timeslots;

providing, at the fixed base-site, a predetermined time difference value and a predetermined threshold value;

sending, at the external interface, the paging request;

receiving, at the fixed base-site, the paging request from the external interface;

generating, at the fixed base-site, a paging signal in response to said receiving a paging request;

generating, at the fixed base-site, said generated paging signal to said first timeslot;

transmitting, at the fixed base-site and responsive to said step of assigning, said paging signal to the one subscriber;

acknowledging, at the one subscriber unit, said transmission of said paging signal;

determining, at the fixed base-site, a time difference between a time when said step of receiving receives the paging request and a time when said step of transmitting transmits said one paging signal; and measuring, at the fixed base-site, responsive to said step of determining and relative to the number of pages said step of receiving receives, the number of pages having said determined time difference greater than said predetermined time difference value; and assigning, at the fixed base-site and responsive to said means for measuring, said generated paging signal additionally to said second timeslot when said measured number of pages is greater than said predetermined threshold value.

26. The method of claim 25 wherein said step of assigning further comprises the step of assigning said paging signal to each of said repetitive timeslots.

27. The method of claim 25 wherein said step of providing a predetermined time difference value further comprises the step of providing a predetermined queue length value.

28. The method of claim 25 wherein said step of receiving further comprises the step of generating a queue for said at least one paging request.

29. The method of claim 28 wherein said step of generating a queue further comprises the step of determining the length of said queue.

30. The method of claim 29 wherein said step of determining further comprises the step of measuring, relative to the number of pages said step of receiving receives, for measuring the number of pages having said determined queue length greater than said predetermined queue length value.

31. The method of claim 30 wherein said step of assigning said generated paging signal additionally to said second timeslot further comprises the step of assigning said generated paging signal additionally to said second timeslot when said measured number of pages having said determined queue length greater than said predetermined queue length value is greater than said predetermined threshold value.

32. The method of claim 31 wherein said step of assigning further comprises the step of assigning said paging signal to each of said repetitive timeslots.

* * * * *